Aug. 14, 1962     G. B. LONG     3,048,985
REFRIGERATING APPARATUS
Filed Dec. 13, 1960     2 Sheets-Sheet 1

INVENTOR.
George B. Long
BY
His Attorney

Aug. 14, 1962            G. B. LONG            3,048,985

REFRIGERATING APPARATUS

Filed Dec. 13, 1960                                            2 Sheets-Sheet 2

INVENTOR.
George B. Long

BY

*His Attorney*

United States Patent Office 3,048,985
Patented Aug. 14, 1962

3,048,985
REFRIGERATING APPARATUS
George B. Long, Dayton, Ohio, assignor to General Motors Corporation, Detroit, Mich., a corporation of Delaware
Filed Dec. 13, 1960, Ser. No. 75,628
2 Claims. (Cl. 62—186)

This invention pertains to refrigerating apparatus and more particularly to controlling temperatures in refrigerated compartments.

It is customary to control temperatures in a refrigerated compartment by a thermostat bulb. Such bulbs operate through fluid motors and mechanical linkages to operate switches or valves for regulating temperatures. The accuracy of such a control is limited by the slowness of its response to the changing temperature conditions and by the friction of mechanical linkages and by the difficulty in making the control responsive solely to the temperature of the bulb. Also, it is difficult to find a single spot in a large compartment which will accurately reflect the temperature of the entire compartment.

It is an object of this invention to provide an accurate temperature control system which is quickly responsive to changes in temperature of the entire compartment.

It is another object of this invention to provide a selective manual adjustment for adjusting the temperature level to be regulated and maintained by such a system.

It is another object of this invention to provide an accurate temperature control system which is quickly responsive to changes in temperatures at several widely spaced locations in a large compartment.

These and other objects are attained in the forms shown in the drawings in which cold air is delivered to an insulated compartment to be kept at a desired refrigerating temperature. This cold air is controlled by a valve or damper which is operated or positioned by a bimetal or a heated wire. To position the bimetal or wire, there is provided an electrical heating arrangement connected in series in an electric circuit with a single thermistor or several thermistors in parallel. A rise in temperature at one or more of the thermistors will cause an increased current flow to increase the heat applied to the bimetal or wire to increase the opening of the damper or valve. A selective adjustment of the temperature is obtained either by adjusting the location of the anchorage for the bimetal or through a variable reactance or variable voltage control.

Further objects and advantages of the present invention will be apparent from the following description, reference being had to the accompanying drawings wherein preferred embodiments of the present invention are clearly shown.

Figure 1:
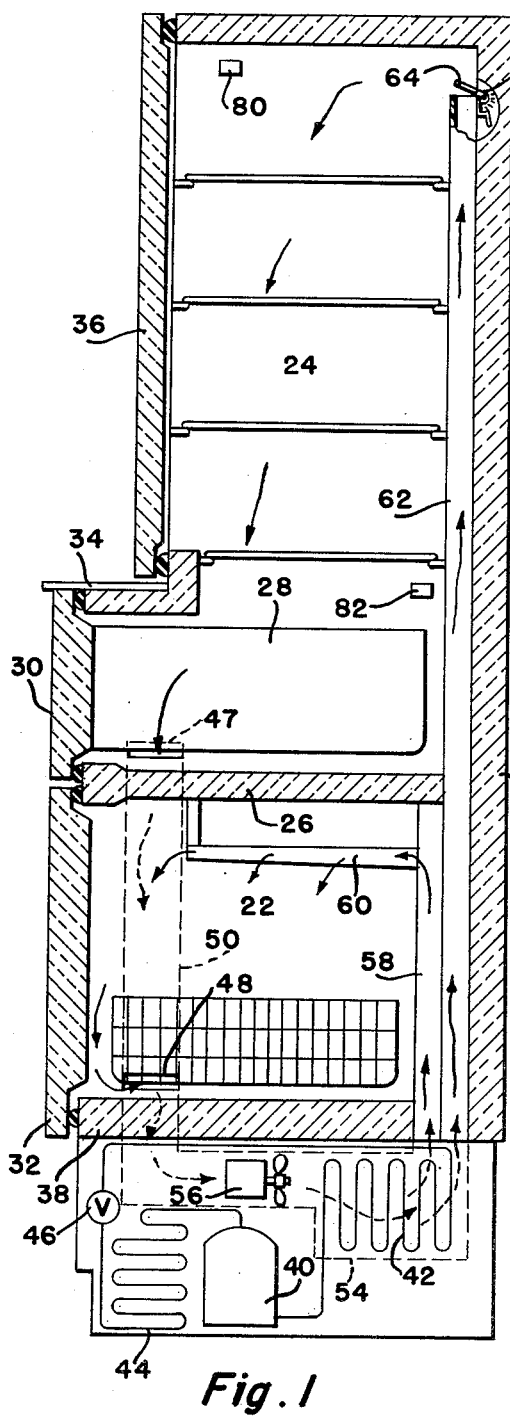
FIGURE 1 is a vertical side sectional view, partly diagrammatic, of a refrigerator embodying one form of my invention.

Referring now to the drawings, there is shown in FIGURE 1 an insulated refrigerator cabinet 20 having a lower below-freezing compartment 22 and an upper above-freezing compartment 24. These compartments are separated by a horizontal insulated wall 26. Directly above the horizontal insulated wall 26 is a drawer 28 provided with a drawer front 30 located above the door 32 for the below-freezing compartment 22 and located below the shelf 34 which is beneath the upper door 36 providing access to the shallow upper portion of the above-freezing compartment above the drawer 28.

Beneath the bottom insulated wall 38 of the cabinet 20 is a refrigerant circuit illustrated diagrammatically including a sealed motor-compressor unit 40 which withdraws evaporated refrigerant from an evaporator 42 and compresses and forces the compressed refrigerant into a condenser 44 from which the liquefied refrigerant is controlled in its flow by a suitable valve or restrictor 46 into the evaporator 42. Air is withdrawn from both compartment 24 and 22 through the outlets 47, located in the front part of the side wall adjacent the bottom of the upper compartment 24, and the outlets 48, similarly located in the lower compartment 22. These are connected to a duct 50 extending downwardly in the side wall to an insulated chamber 54 (shown diagrammatically) located beneath the bottom wall 38 and containing a motor-driven fan 56 for inducing the circulation of air through the duct 50 which forces the air through the evaporator 42. From the evaporator, the air flows upwardly at the rear through a front duct 58 discharging through a hollow ice tray shelf 60 into the below-freezing compartment 22. The remainder of the air is discharged upwardly through a rear duct 62 extending substantially to the top of the above-freezing compartment 24.

Figure 2:
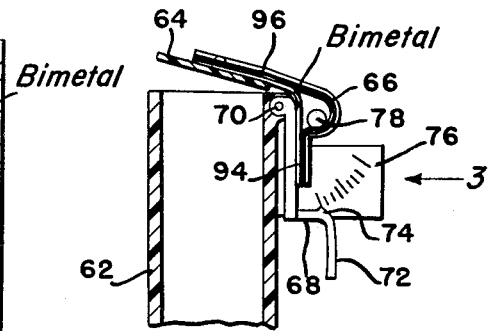
FIGURE 2 is an enlarged side vertical sectional view of the valve or damper shown in FIGURE 1 taken on the line 2—2 of FIGURE 3.
Figure 3:
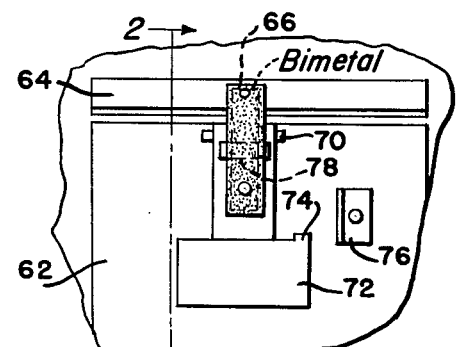
FIGURE 3 is a rear view of the valve or damper shown in FIGURE 2.

According to my invention, at the top of the duct 62, there is provided a modulating valve or damper 64 which is hinged at the rear. This hinge is formed of a bimetal 66 which is arranged to move the valve or damper 64 to the open position when the bimetal is heated and to closed position when it cools. As shown in FIGURES 2 and 3, one end of the bimetal 66 is fastened to an adjustable anchorage 68. The adjustable anchorage 68 is pivoted at its upper end to the upper portion of the duct 62 by a pivot pin 70. The lower end of the adjustable anchorage 68 is provided with a handle 72 and a pointer 74 cooperating with an indicating scale 76 for indicating the degree of adjustment of the anchorage. The adjustment of the anchorage 68 adjusts the location of the valve 64 in such a manner as to select the temperature to be maintained in the compartment 24.

Figure 5:
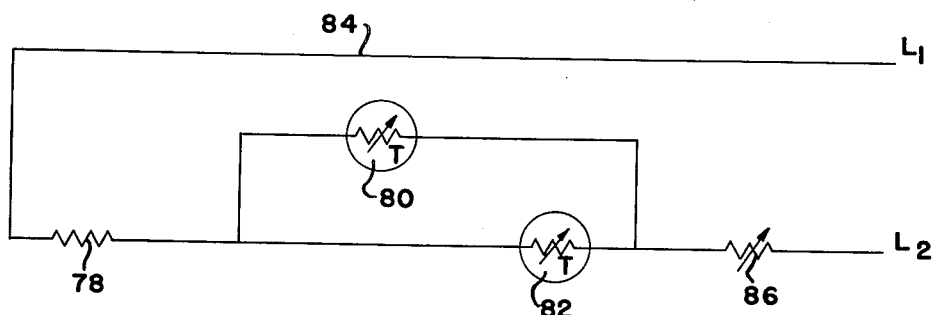
FIGURE 5 is a wiring diagram of the electrical circuit for controlling the valve or damper.

To maintain this selected temperature in the compartment 24, there is provided an electric heater 78 mounted in heat transfer relation with the bimetal actuator 66. To direct the application of the heat from the heater 78 onto the bimetal 66 and to minimize heat leakage into the compartment 24, the heater 78 and the bimetal 66 are enclosed on both sides by thin slabs 94 and 96 of resilient elastomeric foam rubber or plastic. This improves the rapidity of the response to the increase in temperature and improves efficiency. This heater 78 is connected in series with an upper negative temperature responsive resistance 80, sometimes called a thermistor, and a similar lower thermistor 82. The upper thermistor 80 is located in the upper portion of the compartment 24 on the side adjacent the door 36 so that it reflects substantially the temperature conditions existing in the upper half of the compartment 24 while the lower thermistor 82 is located at the rear just above the rear of the drawer 28 so that it reflects the temperature conditions of the drawer and the lower portion of the compartment 24. These thermistors 80 and 82 are preferably connected in parallel with each other and in series with the heater 78 as shown in the circuit 84 illustrated in FIGURE 5. If desired, there also may be included a variable reactance 86 or adjustable voltage control, also in series with the thermistors 80 and 82 and the heater 78 for additional adjustment of the valve or damper 64.

Figure 4:
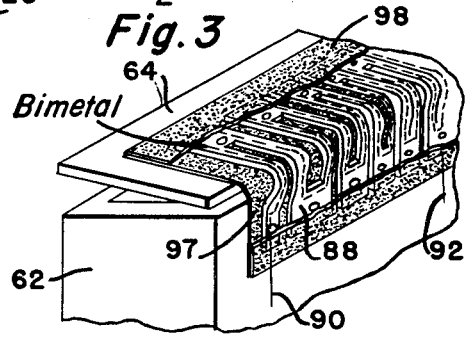
FIGURE 4 is a perspective view of a modified form of bimetal actuating system for the valve or damper.

In FIGURE 4, there is shown a modified form of the invention in which the top of the duct 62 is similarly provided with a valve 64 hinged at the rear. The hinge is similarly formed of bimetal, but the bimetal bearing the reference character 88 is arranged in zigzag form with the alternations extending from the duct 62 to the valve 64. That is, all the upper lobes are fastened to the valve 64 and all the lower lobes are fastened to the duct 62. Instead of providing a separate heater, such as the heater 78, in heat transfer relation with the bimetal 66, the bimetal 88 is self-heated by having conductors 90 and 92 connected to its opposite ends in a circuit similar to that shown in FIGURE 5; that is, the bimetal 88 takes the place of the heater 78 in the circuit shown in FIGURE 5. To prevent the escape of heat from the heated bimetal 88 into the compartment 24 and also to electrically insulate this bimetal 88, there is provided on opposite sides of this bimetal 88 thin slabs 97 and 98 of foam rubber or plastic. In this form shown in FIGURE 4, the selected operating temperature for the compartment 24 is controlled solely by the manually adjustable variable resistance 86 which is in series with the thermistors 82 and 80 as well as the bimetal 88.

In operation, should the compartment 24 rise in temperature adjacent either of the thermistors 80 or 82, the resistance of that thermistor will fall due to its negative resistance characteristics causing an increase in the flow of current through either the heater 78 or the bimetal 88. Both of the bimetals 66 and 88 are arranged with their higher expanding layer innermost so that the application of either the externally produced heat by the heater 78 or the internally generated heat in the bimetal 88 will cause the modulating valve or damper 64 to be moved by the bimetal effect of the bimetal 88 or the bimetal 66 to pivot upwardly the valve 64. The thermistors 80 and 82 as well as the heater 78 and the bimetal 88 rapidly respond to changes in the temperature of the air in the compartment 24 and through their proportionate control of the valve or damper 64 provide a close regulation of the selected temperature in the compartment 24.

Figure 6:
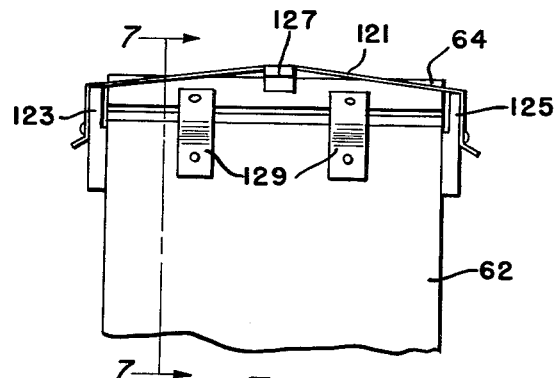
FIGURE 6 is a rear view of the air duct showing another form of actuating system for the damper.
Figure 7:
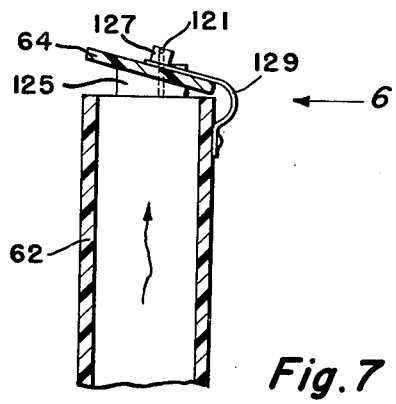
FIGURE 7 is a side sectional view taken on the line 7—7 of FIGURE 6.

In the form shown in FIGURES 6 and 7, there is substituted for the heater 78 an insulated hot wire 121 which is stretched between the anchorages 123 and 125 serving also as electrical terminals on opposite sides of the air duct 62. The mid-point of the hot wire 121 extends over a projection 127 extending above the damper 64. The damper is sprung upwardly by two spring hinges 129 connecting the damper 64 and the rear wall of the duct 62. When the temperatures of the thermistors 80 and 82 are low, only a small amount of current will flow through the circuit similar to FIGURE 5 which includes the hot wire 121 as the substitute for the heater 78. The small current flow when the temperatures of the thermistors 80 and 82 are low will not appreciably heat the hot wire 121 causing it to contract and pull the damper 64 downwardly toward the closed position to decrease the flow of cold air through the duct 62 into the compartment 24. Should the temperature of either of the thermistors 80 or 82 increase, there will be an increase of current through the hot wire 121 causing it to be heated and elongate, thereby allowing the damper 64 to move upwardly to allow a greater flow of cold air to issue from the duct 62. This greater flow of cold air will cool the compartment 24 and lower the temperatures of the thermistors.

While I prefer to use thermistors, it is also possible to use other resistances which change their resistance characteristics either positively or negatively in response to changes in temperature. In the case of resistances having positive temperature characteristics, the bimetals 66 and 88 are reversed so as to reverse their action when heated and cooled. However, thermistors are preferred because they are more responsive to temperature changes. If desired, more than two thermistors may be used to measure the temperature of the compartment 24. By reversing the direction of actuation, a similar arrangement can be used to control heating. Through this arrangement, quick response to changes in temperature in any part of a large compartment can be obtained to quickly adjust the valve 64 so as to maintain the selected temperature at all times.

While the embodiments of the present invention as herein disclosed, constitute preferred forms, it is to be understood that other forms might be adopted.

What is claimed is as follows:

1. Refrigerating apparatus including an undivided insulated storage enclosure containing a fluid, means for removing the fluid from the enclosure and cooling the fluid and returning the fluid to the enclosure, an electrically operable modulating damper means for controlling the return of said fluid to the enclosure, and a plurality of temperature responsive resistors located in different parts of said storage enclosure and connected in parallel electrical circuit with each other and in series with said electrically operable modulating damper means for controlling the position of said damper means according to the temperatures of said resistors.

2. Refrigerating apparatus including an undivided insulated storage enclosure containing a fluid, means for removing the fluid from the enclosure and cooling the fluid and returning the fluid to the enclosure, an electrically operable modulating damper means for controlling the return of said fluid to the enclosure, and a plurality of thermistors located in different parts of said storage enclosure and connected in parallel electrical circuit with each other and in series with said electrically operable modulating damper means for controlling the position of said damper means according to the temperatures of said thermistors.

References Cited in the file of this patent

UNITED STATES PATENTS

| | | |
|---|---|---|
| 2,302,320 | Hintze | Nov. 17, 1942 |
| 2,366,501 | Gille | Jan. 2, 1945 |
| 2,375,988 | Gille | May 15, 1945 |
| 2,474,441 | Sparrow | June 28, 1949 |
| 2,617,595 | Alban | Nov. 11, 1952 |
| 2,791,670 | Murphy | May 7, 1957 |
| 2,896,057 | Grant | July 21, 1959 |
| 2,907,180 | Mann | Oct. 6, 1959 |